(12) United States Patent
Guo et al.

(10) Patent No.: US 7,203,850 B2
(45) Date of Patent: Apr. 10, 2007

(54) POWER MANAGEMENT FOR A NETWORK UTILIZING A VERTEX/EDGE GRAPH TECHNIQUE

(75) Inventors: Zihua Guo, Beijing (CN); Richard Yuqi Yao, Morris Plains, NJ (US); Wenwu Zhu, Basking Ridge, NJ (US); Xin Wang, Beiging (CN)

(73) Assignee: Microsoft Corporation, Redmond, WA (US)

( * ) Notice: Subject to any disclaimer, the term of this patent is extended or adjusted under 35 U.S.C. 154(b) by 470 days.

(21) Appl. No.: 10/760,914

(22) Filed: Jan. 20, 2004

(65) Prior Publication Data

US 2005/0182975 A1 Aug. 18, 2005

(51) Int. Cl.
*G06F 1/00* (2006.01)
*G06F 1/332* (2006.01)

(52) U.S. Cl. ...................... 713/300; 713/320
(58) Field of Classification Search ............... 713/300, 713/310, 320; 370/311, 312; 340/7.38
See application file for complete search history.

(56) References Cited

U.S. PATENT DOCUMENTS

| | | | |
|---|---|---|---|
| 5,371,734 A | 12/1994 | Fischer | |
| 5,636,220 A | 6/1997 | Vook et al. | |
| 5,924,017 A * | 7/1999 | Pinter et al. | 340/7.36 |
| 6,438,375 B1 | 8/2002 | Muller | |
| 6,665,520 B2 * | 12/2003 | Romans | 455/13.4 |
| 6,996,215 B2 * | 2/2006 | MacConnell | 379/106.03 |
| 2002/0016151 A1 | 2/2002 | Romans | |
| 2002/0064140 A1 | 5/2002 | Numminen | |
| 2003/0079198 A1 | 4/2003 | Yamamoto | |

OTHER PUBLICATIONS

Sivalingam, et al.; "Design and analysis of low-power access protocols for wireless and mobile ATM newtworks"; Wireless Networks 6 (2002); pp. 73-87.
Chen, et al.; "A Comparison of MAC Protocols for Wireless Local Networks Based on Battery Power Consumption"; 0-7803-4383-2/98; 1998 IEEE; pp. 150-157.
Stine, et al.; "Improving Energy Efficiency of Centrally Controlled Wireless Data Networks"; Wireless Networks 8; pp. 681-700; 2002.
Burkard, R.E., " Trees and Paths: Graph Optimisation Problems with Industrial Applications", Lecture Notes in Mathematics, XX, XX, vol. 1739, 1999, pp. 1-38.

* cited by examiner

*Primary Examiner*—Chun Cao
*Assistant Examiner*—Suresh K Suryawanshi
(74) *Attorney, Agent, or Firm*—Lee & Hayes, PLLC

(57) ABSTRACT

A power management technique for a network including a plurality of computing devices. The power management technique includes identifying an order in which one or more devices of the plurality of computing devices can transmit data within the prescribed time period. In one aspect, the number of wakeups are reduced for the computing devices within the network by increasing a number of adjacent channel time allocation periods within a prescribed time period that share a common computing device. In one aspect, the network can be based on Time Division Multiple Access (TDMA).

21 Claims, 7 Drawing Sheets

POWER MANAGEMENT FOR A NETWORK UTILIZING A VERTEX/EDGE GRAPH TECHNIQUE

FIELD OF INVENTION

This disclosure relates to computing devices, and more particularly to conserving power in networks containing computing devices.

BACKGROUND

Certain Time Division Multiple Access (TDMA) networks connect a number of computing devices over links based on TDMA technology. With TDMA, network access is subdivided to between a number of computers to within a number of sequential time slots. One computing device is allocated the use of the network during each time slot within a time frame. A computing device may be awake for a particular timeslot if it is transmitting or receiving data within that time slot. To conserve power (particularly in wireless networks and/or with battery operated computing devices such as personal display assistants (PDAs) and hand-held or cellular telephones) it may be desired to let computing devices go to sleep during those time slots that they are not transmitting or receiving data. However, waking up a computing device also consumes considerable power. As such, power management of computing devices within a network often involves this balancing of the power consumed by keeping computing devices awake compared to the power consumed by letting certain computing devices go to sleep, and soon thereafter waking up the computing devices.

Certain computing devices, wireless and cellular telephones, PDAs, and wireless electronic devices use batteries. Reducing energy consumption for battery-based computing devices increases the battery charge lifetime for the devices. Power consumption is often related to whether the computing device is kept awake, allowed to go to sleep, or transitioned between an awake state and an asleep state. Power management becomes an important factor in designing computing devices that can operate on the networks for extended periods.

It would be beneficial to improve the power management for computing devices.

SUMMARY

This disclosure describes multiple aspects of a power management technique for a network including a plurality of computing devices. The power management technique includes identifying a sequence in which one or more devices of the plurality of computing devices can transmit data within the prescribed time period. The number of wakeups for the computing devices within the network is reduced by increasing a number of adjacent channel time allocation periods within a prescribed time period that share a common computing device.

BRIEF DESCRIPTION OF THE DRAWINGS

The same numbers are used throughout the document to reference like components and/or features.

DETAILED DESCRIPTION

Figure 1:
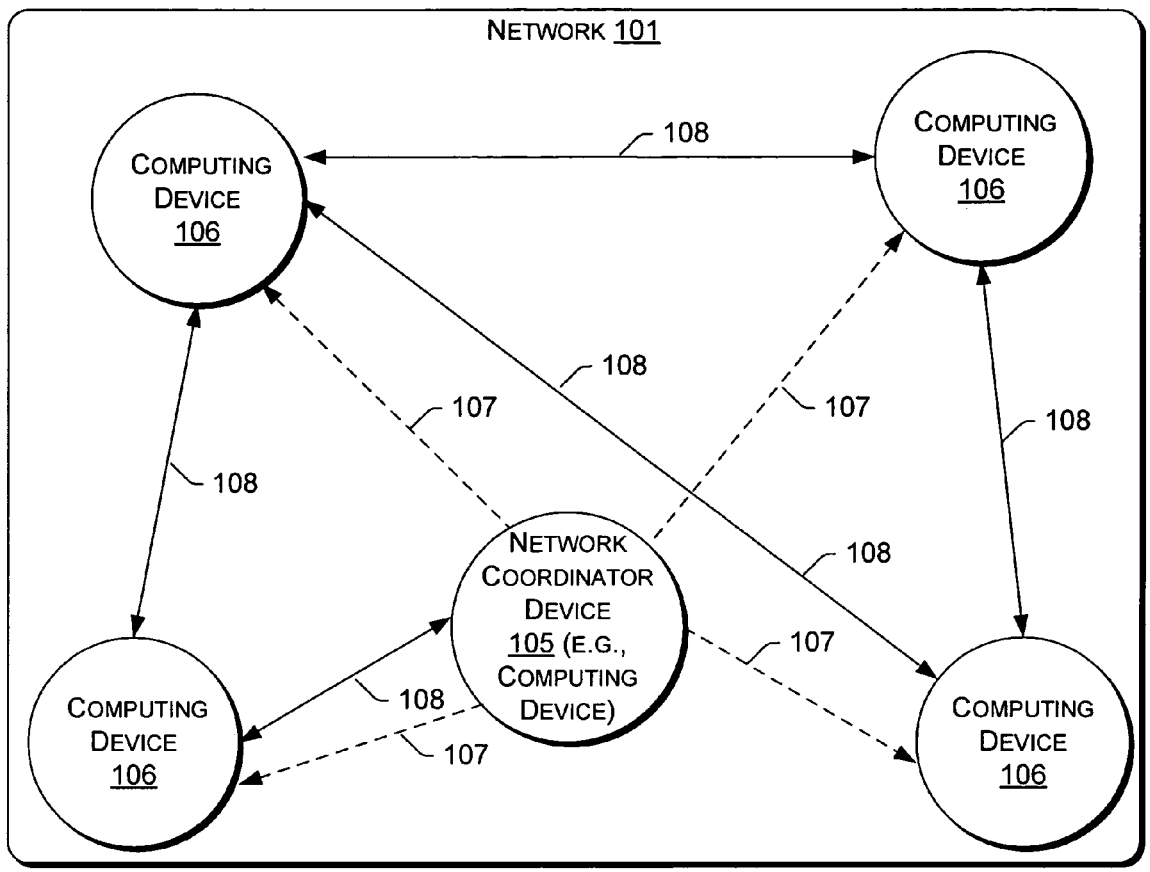
FIG. 1 is a block diagram of one embodiment of a network containing a plurality of computing devices.
Figure 11:
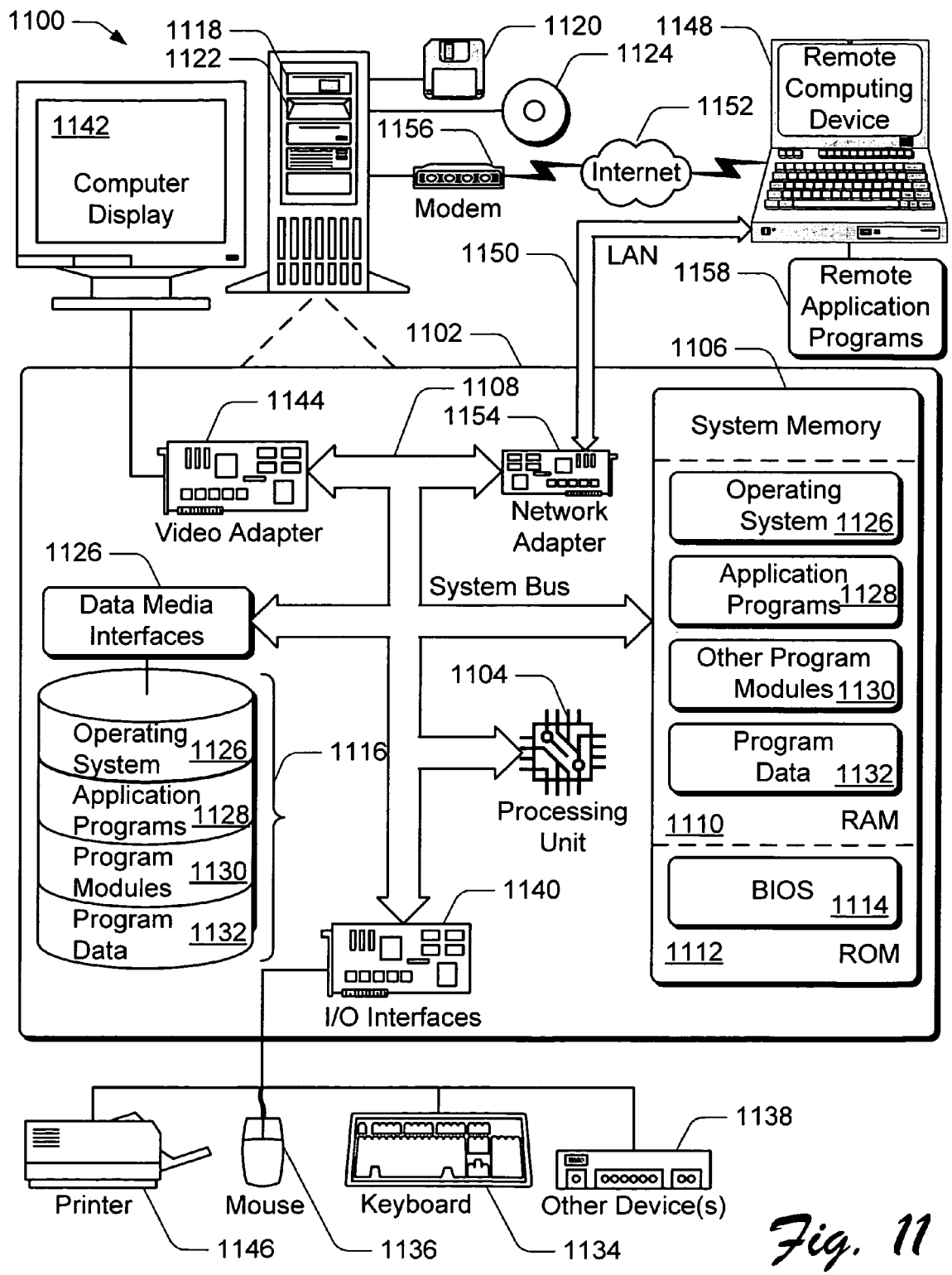
FIG. 11 is a block diagram of one embodiment of computing environment such as can run the reduced degree searching mechanism.

The present disclosure relates to computing devices, and more particularly to the power management of computing devices that are arranged within a time division multiple access (TDMA) network as described with respect to FIGS. 1 and 11. "Flows", as described with respect to FIGS. 3, 4a, and 4b, relate to the desired communication paths between different computing devices within the TDMA-based network that can be arranged in certain sequences. This disclosure provides a reduced degree searching technique that derives sequences for the respective flows to reduce the number of wakeups for the computing devices in a TDMA-based network.

The reduced degree searching technique models the TDMA network using a computer-based vertex/edge graph, examples of which are described with respect to FIGS. 5, 6, 8, 9, and 10. In the vertex/edge graph, the vertices model individual computing devices and the edges model flows between the individual computing devices. The degree of each vertex in the vertex/edge graph (which is considered in the reduced degree searching technique) indicates the number of edges that connect to the vertex. One embodiment of the reduced-degree searching technique is described in a flow-process of FIG. 7.

Power Management

Computing devices (such as personal computers; networked computers; workstations; mainframes; wireless devices consumer electronic devices; portable, wireless, and cellular telephone devices; audio devices; video devices; graphic devices; portable multimedia devices; etc.) can be attached to a large variety of networks, such as a Wireless Personal Area Network (WPAN). In this disclosure, the term "computing device" is intended to be taken broadly and applies to any device that derives, uses, and/or displays the results of a computation. An applicable WPAN standard, IEEE 802.15.3, is entitled "Part 15.3: Wireless WPAN Medium Access Control (MAC) and Physical Layer (PHY)

Specifications for High Rate Wireless Personal Area Networks (WPAN)". Often, networks such as a WPAN include one or more battery-based computing devices. The charge duration of such battery-based computing devices is often limited, and can play a factor in the power management of the network to extend the battery charge duration of the computing devices.

The WPAN protocol relies on Time Division Multiple Access (TDMA) concepts as applied to the Medium Access Control layer to allocate time slots (e.g., channel allocation slots in WPAN) to the different computing devices within the network. Within this disclosure, the term TDMA is applied to any protocol in which time slots are allocated to the computing devices. With TDMA, multiple networked computing devices each share access to a resource (such as a network or a server) using some contention allocation scheme. TDMA is based on a frame structure that includes a sequence of frames, and each frame includes multiple time slots. During each time slot, one particular computing device is allocated the use of the network.

One computing device (referred to in this disclosure as a network coordinator device) controls which computing device transmits data during any time slot over the network. The network coordinator device allocates the time slots based on a contention scheme. In one embodiment, the network coordinator allocates the time slots for each frame among those computing devices that are requesting network usage.

The present disclosure provides a power management technique that reduces the power spent by many of the computing devices by reducing how frequently the devices are awoken from a sleeping state. Reducing the power used by the computing devices on the network extends the battery charge life (before replacing or recharging the battery) of those computing devices.

FIG. 1 shows a block diagram of one embodiment of a computing environment 100 that includes the network 101. The network 101 can include a LAN, a WPAN, a combination of network types, or any other type of network. The network 101 described with respect to FIG. 1 may be configured either as a stand-alone network; or alternately the network may be connected to communicate data with such additional networks. The networked computing environment 100 may include a network coordinator device 105, one or more computing devices 106, and a plurality of beacon signals 107. The network coordinator device 105 of the network 101 may be configured as a hub, a router, or another switch device to (in effect) create a wireless and/or wired network 101 within the networked computing environment 100.

The beacon signals 107 may be physically transmitted over either wireless and/or wired connectors. It is envisioned that in different embodiments, the computing devices 106 will operate using either a rechargeable or disposable battery (not shown). The battery provides portability to a variety of computing devices and other computing devices.

Power management within the network 101 relates to reducing the power exerted by the computing devices when functioning within the network 101. Three power states may be of concern to each computing device in the network within the present disclosure. A first power state of the computing device 101 is awake, in which the computing device is capable of performing its normal operations. While the term "awake" can allow different functions with different computing devices and different networks, it is envisioned that awake computers can operate on the network to transmit/receive signals in a normal manner. A second power state of the computing device 101 is asleep, in which the computing device is in a power-saving state and is incapable of performing normal operation. A third power state of the computing device 106 is transitioning between the asleep state and the awake state (i.e., waking up), during which time the computing device exerts a considerable amount of power.

Each data signal 108 digitally couples one of the computing devices 106 to another computing device in a manner to provide TDMA service between the computing devices 106. The network coordinator device 105, the computing devices 106, and the data signals 108 together delineate the TDMA network 101.

As shown in FIG. 1, one beacon signal 107 extends from the network coordinator device 105 to each respective computing device 106 within the network 101. In one embodiment, the network coordinator device 105 transmits beacon signals 107 to transmit (e.g., broadcast) to each computing device 106 the sequence that the time slots within the different frames are allocated to the different computing devices. The network coordinator 105 can be constructed and considered as one computing device 106 that can effectively communicate with the other computing devices over the network, and can perform the central controlling functionalities to the network 101. The network coordinator 105 may be similar to (considering hardware, software, and/or firmware aspects) the other computing devices within the network 101 except for the addition of those components that provide for the functionality of coordinating the network access between the different computing devices. The network coordinator can be responsible for the system timing, Quality of Service (QoS) control, power management, security, etc. of the computing devices within the TDMA network.

Figure 2:
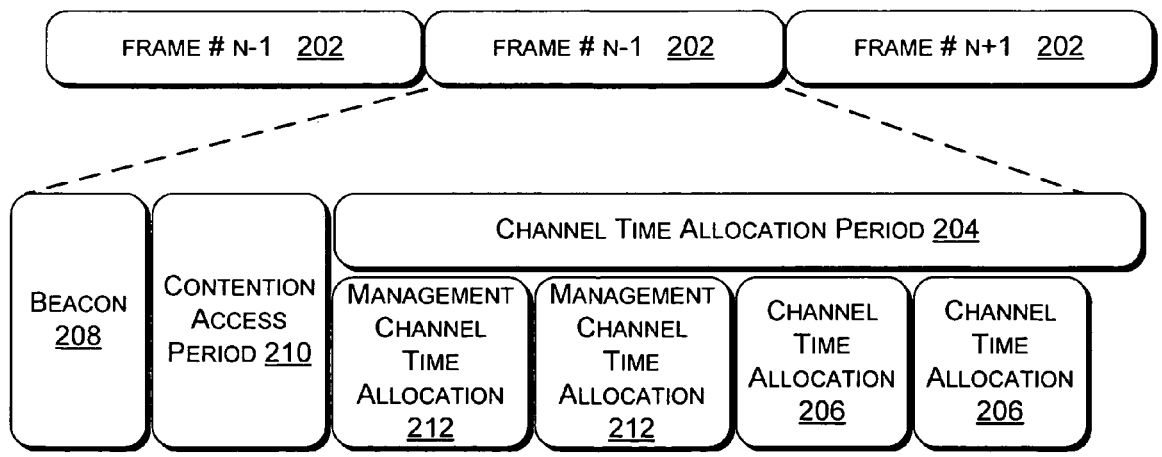
FIG. 2 is a diagram of a sample frame and its components, such as is used to transmit time division multiple access (TDMA) data between multiple computing devices.

Certain embodiments of the TDMA based network 101 use channel allocation slots 206 (which are one embodiment of time slots such as used in WPAN networks) as described with respect to the frames 202 in FIG. 2. Only one computing device can transmit data (e.g., packets) within the network 101 during each channel allocation slot 206. The computing devices 106 that operate within the network 101 are awake during those TDMA-based channel allocation slots 206 (or time slots) that they are transmitting or receiving a signal, and can be asleep during other channel allocation slots (or time slots) that they are transmitting or receiving a signal to conserve power. Waking up a computing device 106 from a sleeping state to an awake state requires a considerable amount of power to be spent by that computing device 106. As such, to provide an efficient power management design for a network 101 involves balancing the power saved from maintaining the computing device in its awake state compared to the power spent to transition the computing device to its more energy efficient asleep state, then having to wake up the computing device into its awake state during the next time slot in which the computing device is participating.

The power management mechanisms as described relative to the network 101 within this disclosure diminish the battery discharge rate of the networked computing devices 106. Waking the computing devices from their "asleep" state less often increases the battery life (between recharging) of the computer devices 106. In general, increasing the duration for which battery life lasts in certain networks assists the network 101 in becoming better accepted by users. WPANs are particularly designed for low power/low cost devices. The power conservation aspects of the present disclosure are thus particularly suited for WPANs to extend the battery-charge duration of the computing devices.

FIG. 2 describes one embodiment of a frame 202 (such as a superframe as described in as the WPAN protocol) that provides structure to the communications within the network 101 of FIG. 1. The MAC layer of the network 101 of FIG. 1 relies largely on TDMA concepts such as the use of the frame 202 as described with respect to FIG. 2. During normal operations, the network coordinator device 105 broadcasts a beacon signal 107 of FIG. 1 to each other computing device 106 within the network 101 during the beacon period 208 within the frame 202 of FIG. 2. The beacon signal 107 sent during the beacon period 208 describes the specific sequence and duration of the channel allocation slots 206 for each computing device.

Each frame 202 as described with respect to FIG. 2 includes a channel allocation period 204, the beacon period 208, and a contention access period 210. The frame 202 may also be referred to as a "superframe" in certain embodiments (e.g., such as applied to WPAN networks). The contention access period 210 can be used to communicate commands and/or asynchronous data if it is presented in the frame 202.

One embodiment of the channel allocation period 204 includes one or more management channel time allocation (MCTA) periods 212 and one or more channel allocation slots or time slots 206. Though only two illustrative channel allocation slots or time slots 206 are shown in FIG. 2, there can be a large number of the channel allocation slots or time slots. In one embodiment, the MCTAs 212 are a type of CTA 206 that are used for communications between the computing devices 106 and the coordinator device 105. The channel allocation slots 206 are considered within the frame 202 as units in a contention-based TDMA protocol in which one particular computing device can transmit data over the network. Each user within the network 101 controls the data transfer within the network during their respective channel allocation slot 206 within the frame 202.

The network coordinator 105 as described with reference to FIG. 1 assigns different channel allocation slots 206 within the channel allocation period 204 to different computing devices 106 based on the reduced degree searching mechanism described herein. Which computing device is to receive or send data during a particular channel allocation slot 206 is identified by the network coordinator 105 using the beacon signal during the beacon period 208. The network coordinator 105 derives the computing device that has control of signal transmissions during each channel allocation period, as discussed in more detail below. The duration of the channel allocation periods typically can be set within the network 101.

Figure 3:
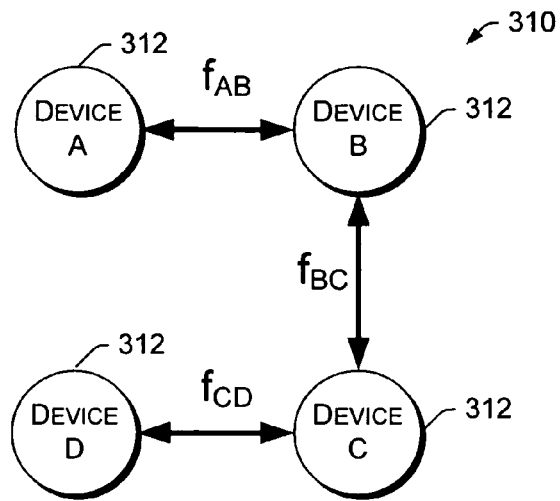
FIG. 3 is a sample graphical representation of a flow topology including a plurality of computing devices associated by flows.

FIG. 3 describes one embodiment of a flow topology graph 310 that is arranged with a plurality of vertices, each of which represents a computing device; and flows that represent requested signal connections between computing devices. Within the flow topology graph 310, flows (shown as $f_{AB}$, $f_{BC}$, and $f_{CD}$ in FIG. 3) represent a graphical representation of the data signal 108 between the computing devices 106.

Computing devices typically expend considerably more energy when they are in an awake state than when they are in an asleep state. To conserve power in general, it is desired to allow computing devices 106 to sleep during those channel allocation periods 206 that they are not actively transmitting or receiving data as indicated by either end of the flow being in contact with the device, and wake up during the channel allocation periods that are allocated for their flows. Each computing device 106 can therefore wake up only in those channel allocation periods in which they are included (at either end of the data signal 108 as shown in FIG. 1 or the flows as described with respect to FIG. 3). Each computing device can go to sleep at the end of the channel allocation period if that computing device is not included in the next channel allocation period 206.

As described herein, the power management problem becomes associated with selecting the sequence of flows between computing devices 312 in a flow topology graph 310 (which relate to the computing devices 106 within the network 101 of FIG. 1) to reduce the total number of computing device wakeups. Applying the power management technique (such as the reduced degree searching technique as described herein) is beneficial within a typical multi-computing device and multi-flow environment.

The flow topology graph 310 in FIG. 3 includes a flow $f_{AB}$ that extends between the computing device A 312 and the computing device B 312. A flow $f_{BC}$ extends between the computing device B 312 and the computing device C 312. A flow $f_{CD}$ extends between the computing device C 312 and the computing device D 312. With the flow topology graph 310 as shown in FIG. 3, the computing device B 312 can forward a data stream between the computing device A 312 and the computing device C 312. Computing device C 312 transmits a data stream between the computing device B 312 and the computing device D 312. During an illustrative flow such as $f_{AB}$ between computing device A and computing device B for example, data can be transmitted either from the computing device A to the computing device B, or vice versa. As such, flows can be considered as non-directional.

The sequence of the flows determines the number of computing devices 312 that have to be woken up during each frame. The effect of the sequence of the flows on the power management in the network 101 is demonstrated within the flow diagrams of FIGS. 4a and 4b. The flow diagrams of FIGS. 4a and 4b are based on the illustrative flow topology graph 310 of FIG. 3.

Figure 4A:
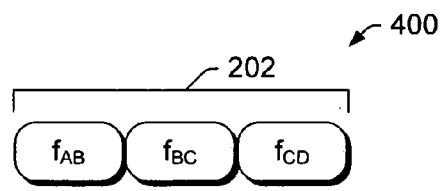
FIGS. 4a and 4b are flow diagrams that describe the sequence of flows from the flow topology of FIG. 3.
Figure 4B:
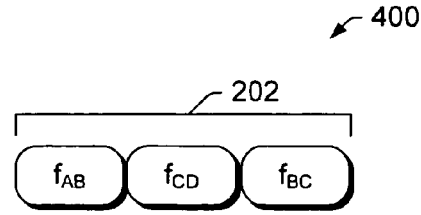

FIGS. 4a and 4b show two alternate example flow diagrams 400 that illustrate multiple sequences of the flows $f_{AB}$, $f_{BC}$, and $f_{CD}$ as shown in the illustrative flows of FIG. 3. The series of the three flows $f_{AB}$, $f_{BC}$, and $f_{CD}$ are each arranged as the frame 202 in both FIGS. 4a and 4b. The sequence of the flows within a flow diagram 400 determines how many computing devices 106 have to be woken up during a frame 202. Each flow within the flow diagram 400 can wake up zero, one, or two computing devices. In a flow which has two wake-ups, two computing devices have to be woken up. In a flow which has one wake-up, only one computing device has to be woken up. In a flow which has no wake-ups, no computing device has to be woken up.

If there is more than one flow between any pair of computing devices 106, the multiple flows can be combined into a single flow within a flow diagram such as shown in FIG. 3 since the multiple flows can be allocated at contiguous channel allocation periods within the frame 202. These repetitive flows between the same pair of flows thereby contribute zero wake-ups beyond the one wake-up associated with a single flow extending between a pair of computing devices. Combining multiple flows between the same pair of computing devices into a single flow reduces the power used by computing devices within the network.

As discussed within this disclosure, the power management problem as described within this disclosure largely results from each computing device often requiring much power to wake up after it has gone to sleep. The greater the number of wake-ups for a flow diagram, the more average power is used by the computing devices within the network 101.

Therefore, the fewer times that all of the computing devices 105 within the network 101 are awaken (which can be indicated by a reduced order of all of the flows), generally, the less power is used by the computing devices within the network 101. As the computing devices 105 within the network 101 are awoken fewer times, more power is conserved by the computing devices within the network 101.

FIGS. 4a and 4b provide two embodiments of flow diagrams which are used to demonstrate the power that certain computing devices can save by using certain flows compared to other flows. Consider the flow diagram of FIG. 4a. The flow $f_{AB}$ contributes a wake-up of 2 because it is the first flow, and therefore cannot share a computing device with a prior flow because there are no prior flows in the frame 202. Two consecutive flows sharing the common computing device A results in a wake-up of 1 for the computing device. With the flow diagram of FIG. 4a, the flow $f_{AB}$ occurs directly prior to flow $f_{BC}$. These two consecutive flows share the computing device B, thus the flow $f_{BC}$ has one wake-up. Flow $f_{BC}$ occurs immediately prior to flow $f_{CD}$, and these two consecutive flows share computing device C, thus the flow $f_{CD}$ has one wake-up. The total number of wake-ups in FIG. 4a is therefore 2+1+1=4.

With the flow diagram of FIG. 4b, the flow $f_{AB}$ contributes two wake-ups because it is the first flow and cannot share a computing device with a prior flow (because there is no prior flow to flow $f_{AB}$ in the frame 202 shown in FIG. 4b). As such, both computing devices A and B have to wake up. The flow $f_{CD}$ contributes two wake-ups because it does not share any devices with the prior flow $f_{AB}$. As such, both computing devices C and D have to wake up. The computing device B will therefore go back to sleep after flow $f_{AB}$, and considering that the computing device B is included in the third flow $f_{BC}$, then the computing device B needs to wake up again for the 3rd channel allocation period for flow $f_{BC}$. Flow $f_{BC}$ is adjacent to flow $f_{CD}$, and these two flows share computing device C and therefore the flow $f_{CD}$ has one wake-up. The total number of wake-ups in FIG. 4b is therefore 2+2+1=5.

Based on the above disclosure, since the flow diagram in FIG. 4a has a total of four wake-ups while the flow diagram in FIG. 4b has a total of five wake-ups. The flow diagram in FIG. 4a and the flow diagram in FIG. 4b differ only by the sequence of the flows. The computing devices 106 within the network 101 as shown in FIG. 3 will average a higher power consumption when following the flow diagram of FIG. 4b than when following the flow diagram of FIG. 4a due to the greater number of wake-ups. Considering the large number of frames 202 that occur within even a relatively small network 101, reducing the number of wake-ups within many of the frames 202 can thereby result in a considerable power savings to the computing devices within the network 101.

Reduced Degree Searching Using Vertex/Edge Graphs

Figure 7:
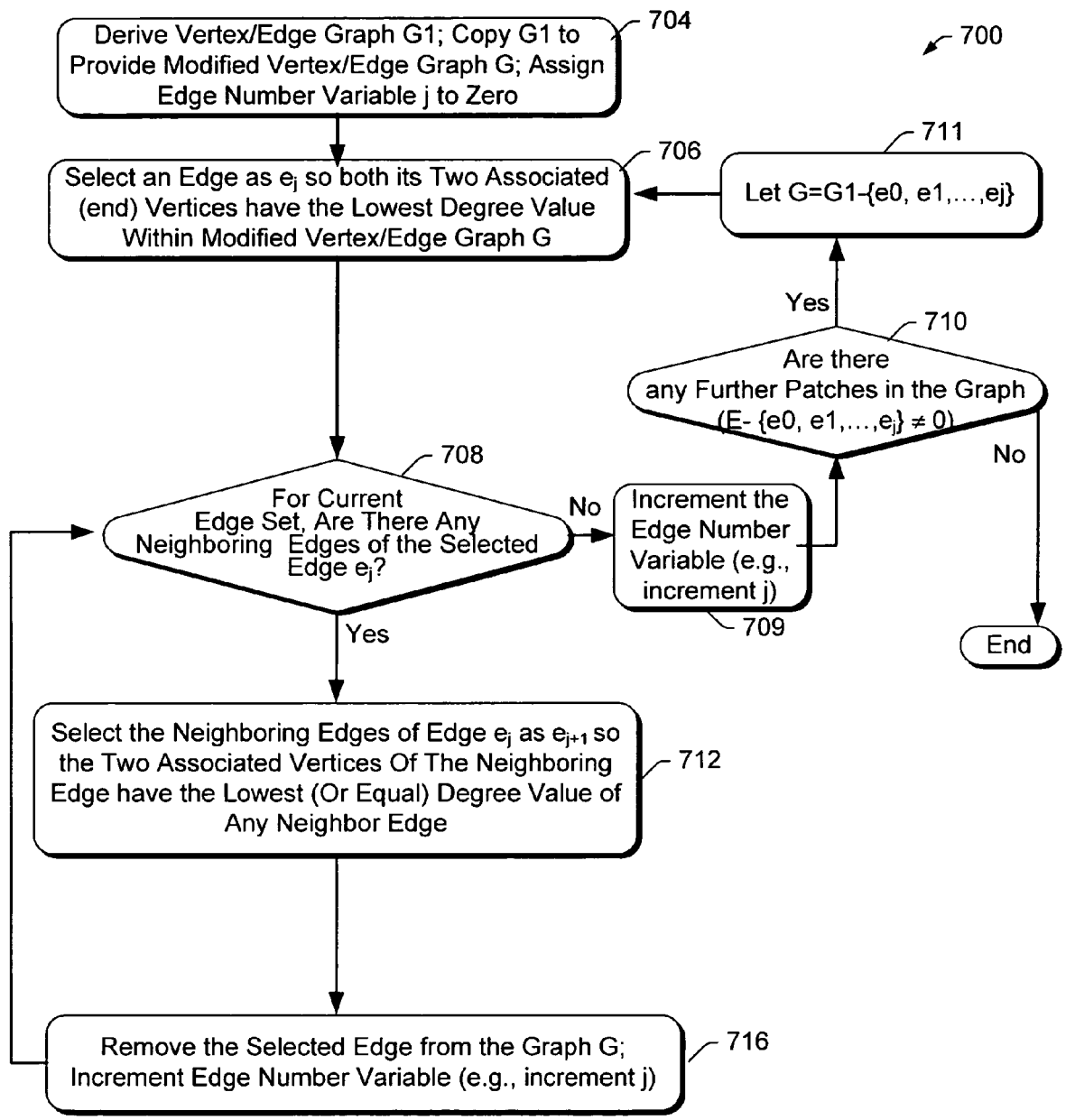
FIG. 7 is a diagram of one embodiment of a reduced degree searching mechanism.

As mentioned above, one aspect of the power management problem can be viewed as deriving a desired sequence of flows within the flow topology graph 310 of FIG. 3. This disclosure describes a "reduced degree searching" mechanism as shown in FIG. 7 that can in many instances derive results to be applied to an improved flow sequence in the flow topology graph 310 of FIG. 3 to reduce the total number of the computing devices 105 that must wake up during each frame. The reduced degree searching mechanism is now described, and the relation between the reduced degree searching mechanism of FIG. 7 and the flow topology graph of FIG. 3 is described below.

Figure 5:
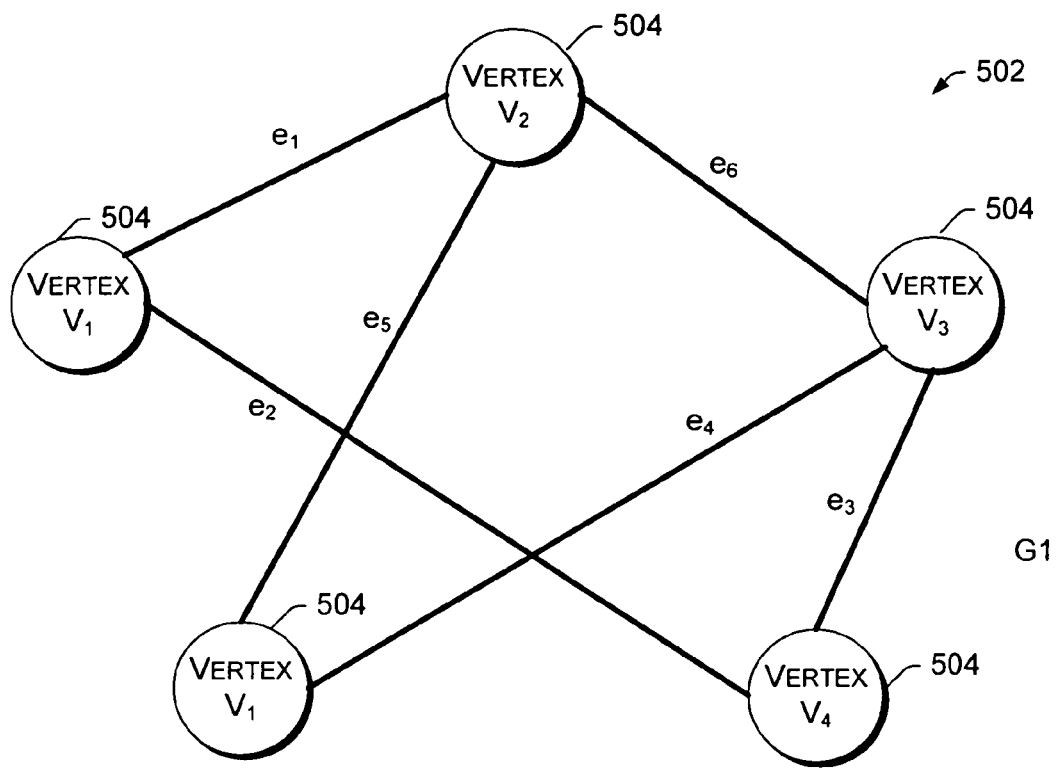
FIG. 5 is a diagram of an example of a generated vertex/edge graph in which the vertices are all arranged in a single patch in which all the vertices are connected either directly or indirectly.
Figure 6:
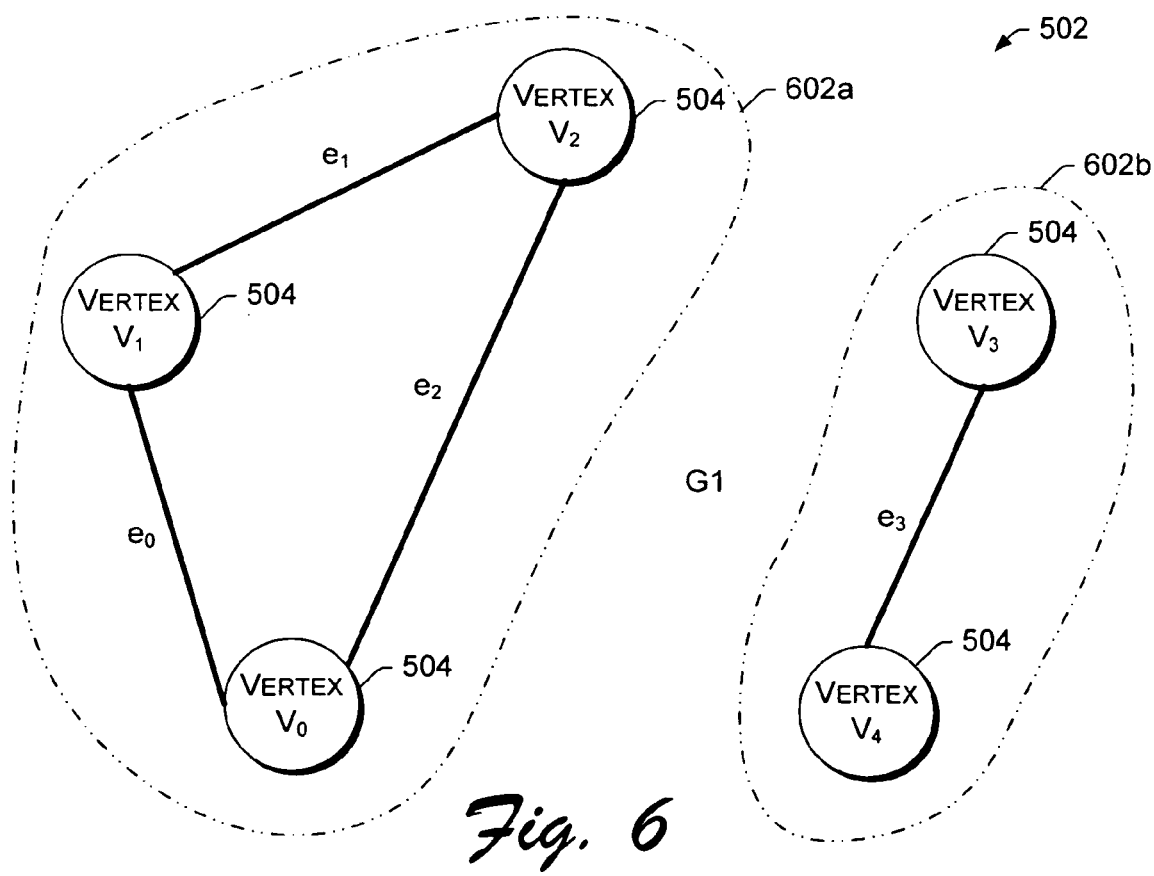
FIG. 6 is a diagram of an example of a generated vertex/edge graph in which the vertices are arranged within two patches, wherein in each patch, all of the vertices are connected either directly or indirectly.

The degree of a vertex describes the number of vertices that terminate at the vertex. The reduced degree searching mechanism operates within the realm of graphs that derive sequences based on edges and vertices as described in this disclosure. One embodiment of the "reduced degree searching" mechanism can derive a sequence of edges that can be used to conserve power for many of the computing devices that are operating within the network 101 by decreasing the total number of wakeups for all of the computing devices 105 within the network 101 is now described. The "reduced degree searching" mechanism of FIG. 7 involves establishing a vertex/edge graph G1, examples of which are described with respect to FIGS. 5 and 6, according to the following rules:

1. Each computing device 106 within the networked computing environment 100 of FIG. 1 is denoted as a vertex $V_m$ 504 within the vertex/edge graph G1, where m represents an integer that distinctly identifies each individual computing device 106 based on the integer value of the vertex 504. As such, the reference character "$V_m$" is shown within the node for the corresponding computing device in FIGS. 5 and 6. In FIGS. 5 and 6, the number of the vertex $V_m$ is represented by the integer applying to the corresponding device 106.
2. Provide an edge $e_n$ (where n is designated as an integer as shown in FIGS. 5 and 6) between two vertices 504 if and only if there is a flow between those two corresponding computing devices 106 within the network 101 in the flow topology graph of FIG. 3. Each edge $e_n$ extends between two vertices, and can be identified relative to other edges. There does not have to be an edge between each pair of vertices.

The vertex/edge graph G1 (examples shown in FIGS. 5 and 6) results from applying these rules. Each vertex in vertex/edge graph G1 corresponds to a computing device, and each edge in vertex/edge graph G1 corresponds to a flow between two computing devices. Assume there are M vertices 504 and N edges $e_n$ in the vertex/edge graph. The power management problem can be simplified to scheduling the edges $e_n$ in the vertex/edge graph G1 so that the maximum number of contiguous edges (preferably every two contiguous edges) shares a common vertex 504.

Since at least one new computing device 106 needs to wake up each time a new flow is served, the reduced number of the wakeups is lower bounded by N+D with D denoting the number of patches (in which all the vertices in the patches are connected to each other with edges) in the vertex/edge graph G1. For example, the vertex/edge graph in FIG. 6 includes three interconnected vertices 504 in a first patch 602a and two interconnected vertices in a second patch 602b. Each "patch" may be visualized as an island of interconnected vertices in which all of the vertices are interconnected either directly or indirectly by at least one edge to each other vertex within the patch. No vertex contained within one patch is connected by an edge to a vertex contained in another patch. For example, no vertex in the patch 602a can be connected (either directly or indirectly) to any vertex in the patch 602b since the vertices are in different patches. When the vertex/edge graph G1 is a connected graph in which those vertices that are connected by edges are maintained within only one patch, such as shown in FIG. 5, the lower bound of the reduced number of the wakeups is N+1. In FIG. 6 that has two patches, the lower bound of the reduced number of wakeups is N+2.

Using a graph theory, a lower bound and upper bound for the reduced wakeup times for the computing devices within the network 101 can be determined using the Hamilton path, a known algorithm.

The "reduced degree searching" mechanism as described herein attempts to find an order of the flows so that each contiguous pair of flows shares a common computing device. This is not always achievable, such as when the modified vertex/edge graph is not a connected graph in which certain ones of the vertices are not connected either directly or indirectly to certain other edges as described with respect to FIG. 6. For a given vertex/edge graph, the degree may not achieve the lower bound described above. The exhaustive search of the optimal degree such as provided by current mechanisms bears a complexity of finding the potential sequences of edges in a vertex/edge graph as N factorial (N!), which demands excessive computing resources, computing effort, and processing time. The "reduced degree searching" mechanism reduces the computing effort and processing time in most instances, which is especially significant in power management applications such as the network 101 especially as described with respect to the battery operated and wireless embodiments of the computing devices as described within FIG. 1.

One embodiment of a reduced degree searching algorithm is described with respect to Table 1. The reduced degree searching algorithm is further described in greater detail within this disclosure with respect to FIG. 7.

TABLE 1

Reduced Degree Searching Algorithm

1. Let a modified vertex/edge graph G = the vertex edge graph G1; Let an edge number variable j = 0.
2. Select an edge as $e_j$ in the modified vertex/edge graph G so that both of the edge's associated vertices have the lowest degree of any pair of associated vertices in the modified vertex/edge graph G.[1] (see footnote described in text following table)
3. For current set of edges $\{e_0, e_1, \ldots, e_j\}$, remove the current edge (and any previously removed edge) in the modified vertex/edge graph $G = G1 - \{e_0, e_1, \ldots, e_j\}$. If there are no neighboring edges of the current edge $e_j$, then increment the edge number variable (e.g., increment j) and continue to step 5. If there are neighboring edges of the current edge $e_j$, then among the neighboring edges of the edge $e_j$, select a new edge as $e_{j+1}$ so that both the degree of the selected vertex and the degree of the neighbor vertex have a minimum degree value (which is greater than 0) for any selected vertex and neighbor vertex; then increment the edge number variable (e.g, increment j).
4. Continue step 3 until the reduced degree searching technique cannot proceed (e.g., when the current vertex has no neighbor vertices).
5. If $E - \{e_0, e_1, \ldots, e_j\} \neq \emptyset$, let $G = G1 - \{e_0, e_1, \ldots, e_j\}$ and go back to Step 2; otherwise there are no further edges in G, therefore stop the reduced degree searching algorithm.

The reduced degree searching technique of Table 1 is expanded somewhat with reference to one embodiment of a flow diagram of FIG. 7 that produces a sequence of edges which can be correlated to a desired sequence of flows between computing devices. As noted in footnote 1 of step 2 in Table 1, the phrase "both of the edge's associated vertices having the lowest degree" means that first, among all candidate vertices, find those with the minimum degree (with the degree being>0). For each candidate vertex with the minimum degree, find the one whose neighboring vertex has the minimum degree. Finally, choose the pair of vertex with the minimum degree. Such computing devices experience a reduced number of wake-ups of the computing devices, and thereby may be considered as operating using a power management technique. The reduced degree searching technique 700 of FIG. 7 relies on generating and analyzing a representative vertex/edge graph G1 as shown in FIGS. 5 and 6 (and also FIGS. 8, 9, and 10 where the edges are indicated by their adjacent vertices instead of by the edge number) in which the selections of the edges between their respective associated vertices can be determined for each time slot. In operation 704, a modified vertex/edge graph G is derived from (and can initially be a copy of) the vertex/edge graph G1. The vertex/edge graph G1 and the modified vertex/edge graph G include edges with interconnecting associated vertices which correspond graphically to the data signals 108 communicating between computing devices within the network 101 as described with respect to FIG. 1. The edges can be computationally removed from the modified graph G using the reduced degree searching technique. Note that the order in which the edges are removed corresponds to the selected sequence of the flows within the flow topology graph 310 of FIG. 3. Considering the vertex/edge graph G are discussed with reference to FIGS. 5 and 6, the value j identifies an edge number variable of each edge $e_j$, and the edge number variable j is initially initialized in the modified vertex/edge graph G as described with respect to Table 1 to 0. The edge number variable is incremented in operations 709 or 716 to progress through successive edges $e_j$ within the vertex/edge graph G1 during the reduced degree searching technique.

The reduced degree searching technique 700 uses the modified vertex/edge graph G that is obtained from the vertex/edge graph G1 of FIG. 5 or 6 to remove the edges in a sequence that increases the number of contiguous edges in the sequence that share a vertex. In operation 706, any edge whose two associated vertices share the same reduced degree (e.g., which may be a minimal degree) is selected. The reduced degree is found by a) finding all of the vertices within the modified vertex/edge graph that have a smallest degree, and then b) using the vertices found in a, select an edge that has at least one of the vertices from a and that has associated vertices with the smallest sum. If multiple edges satisfy the query of b), then one can be picked randomly of by some other criteria. The reduced degree is determined by: a) finding all of the vertices within the entire modified vertex/edge graph G that have the smallest degree, and b) using the vertices found in a, select an edge that has at least one of the vertices from a and that has associated vertices with the smallest sum. If multiple edges satisfy the query of b), then one can be picked randomly or using some other criteria.

For instance, with the vertex/edge graph shown in FIG. 5, only edge $e_2$ has both of its associated vertices $V_1$ and $V_4$ with a degree of 2 (which is the lowest degree for any vertex in FIG. 5). As such, by applying the reduced degree searching technique of FIG. 7 to the modified vertex/edge graph G as shown in FIG. 5, the selected edge whose associated vertices would both share the same minimal value would be $e_2$. As such, the edge $e_2$ is the first edge that is removed from the graph G.

Candidate vertices having the reduced (e.g., minimal) degree are determined by considering the reduced number of edges $e_j$ in the modified vertex/edge graph G that contacts the vertex. Therefore, a vertex in contact with fewer edges corresponds to having a reduced degree of the vertex/edge graph. The present disclosure provides a technique to find those edges having associated vertices with the same reduced degree based on step 2 of Table 1. In general, by removing those edges whose associated vertices have a lower degree sooner than those edges whose associated vertices have a higher degree, relatively few edges have to be removed to disconnect the associated vertices of the earlier-removed edges from each patch. Thus, an efficient technique is provided to remove the edges from the patches.

Decision 708 of the reduced degree searching technique determines whether there are any neighboring edges to the selected edge in 706 considering the current set of edges $\{e_0, e_1, \ldots, e_j\}$, in the vertex/edge graph $G=G1-\{e_0, e_1, \ldots, e_j\}$. Within this disclosure, the term "neighbor" can be applied to either vertices or edges. A first vertex is a neighbor of a second vertex if and only if there is an edge connecting the first vertex and the second vertex. A first edge is a neighbor of a second edge if and only if the first edge and the second edge contact the same vertex.

Edges are considered to be non-directional since any respective computing device that is associated with one of each respective associated vertex has to be awake during each time-slot that the edge is awake. As such, neighbor edges to an edge include those edges that contact both associated vertices to any given edge.

If the answer to decision 708 is no, indicating that there are no further neighbor edges connected to the selected edge, then the reduced degree searching technique continues to decision 709. In 709, in edge number variable (j) representing the edge ($e_j$) is incremented wherein the reduced degree searching technique continues to the next edge.

Following 709, the reduced degree searching mechanism continues to decision 710 in which it considers whether there are any further edges (e.g., 602a and 602b as described with respect to FIG. 6) by considering whether $E-\{e_0, e_1, \ldots, e_j\} \neq \emptyset$. If the answer to the decision 710 is no, then the reduced degree searching technique 700 terminates because all of the edges have been considered for all of the patches that were included within the vertex/edge graph G1. If the answer to the decision 710 is yes, then the reduced degree searching technique continues to the operation 711 to continue processing to other edges for further patches. In operation 711, the modified vertex/edge graph is reconfigured by the last selected edge being removed. The sequence of the edges being removed corresponds to the order of the flows within the frames 202 as shown in FIGS. 4a and 4b. Following 711, the reduced degree searching technique 700 returns to 706 as described above to select a new edge, and evaluate further candidate vertices within the new patch.

If the answer to the decision 708 as described above is instead yes, then there are further edges in the patch in which the present candidate vertex is located. An order in which these edges are removed is then to be determined. The reduced degree searching technique 700 continues to operation 712 in which the neighbor edges to the selected edge $e_j$ (from 706) are considered to select one neighbor edge $e_{j+1}$ whose associated vertices have the minimal degree of any edge that is a neighbor to the edge $e_j$. In many embodiments, operation 712 acts to select the neighboring edge $e_{j+1}$, of the edge $e_j$ so the two associated vertices have the lowest degree of any other edge that is a neighbor to the selected edge (e.g., in many instances a minimum degree).

Following operation 712, the reduced degree searching technique continues to the operation 716 in which the current edge is removed, and the edge number variable (j) is incremented. The effect of removing the current edge and incrementing the edge number variable is to progress through successive neighbor edges within the patch, and the original edge $e_j$ is removed from the vertex/edge graph. The sequence in which the edges $e_j$ are removed from the graph corresponds to the selected pairs of computing devices 106 that are associated with each data signal 108 (as described with respect to FIG. 1) is provided control of the network to transmit its data signal.

By removing an edge from the vertex/edge graph in operation 716, the edge and any vertex that is no longer connected by an edge to another vertex within the patch is no longer considered as a portion of the patch. The neighbor edge (which will become the next selected candidate edge) and any further vertices that connect to the neighbor edge via one or more edges (plus these interconnecting edges) will form the remainder of the same patch. Following operation 716, the vertex that was connected to the candidate vertex via the removed edge becomes the new candidate vertex. Following 716, the reduced degree searching technique returns to decision 708 in which it is determined whether there are any further edges remaining within the graph.

The decision 708 and the operations 712 and 716 form a loop within the reduced degree searching technique that is continued until the response to the decision 708 is no, at which point all of the edges have been removed from a patch within the vertex/edge graph G. The reduced degree searching technique 700 as described with respect to FIG. 7 will thereby remain within the loop as set forth by the decision 708 and the operations 712 and 716 until such time as there is not another neighbor edge. At this time, there are no further edges in the patch, and the reduced degree searching technique 700 continues to decision 708, operation 709, decision 710, operation 711, and operation 706 as described above in an effort to locate a new patch, or alternatively end the routine.

The sequence in which the respective edges are removed from the graph G as determined by the reduced degree searching mechanism of FIG. 7 corresponds to the sequence in which the flows are arranged within the frames as described with respect to FIG. 3. Thus, for example, the first flow will be the flow that corresponds to the first edge that is removed from the graph G. Using the reduced degree searching mechanism to determine the sequence of flows between the computing devices 312 in FIG. 3 can provide an effective flow order by which a reduced number of wakeups for computing devices can be provided as described relative to FIGS. 3, 4a, and 4b.

Examples of the Reduced Degree Searching Technique

Figure 8:
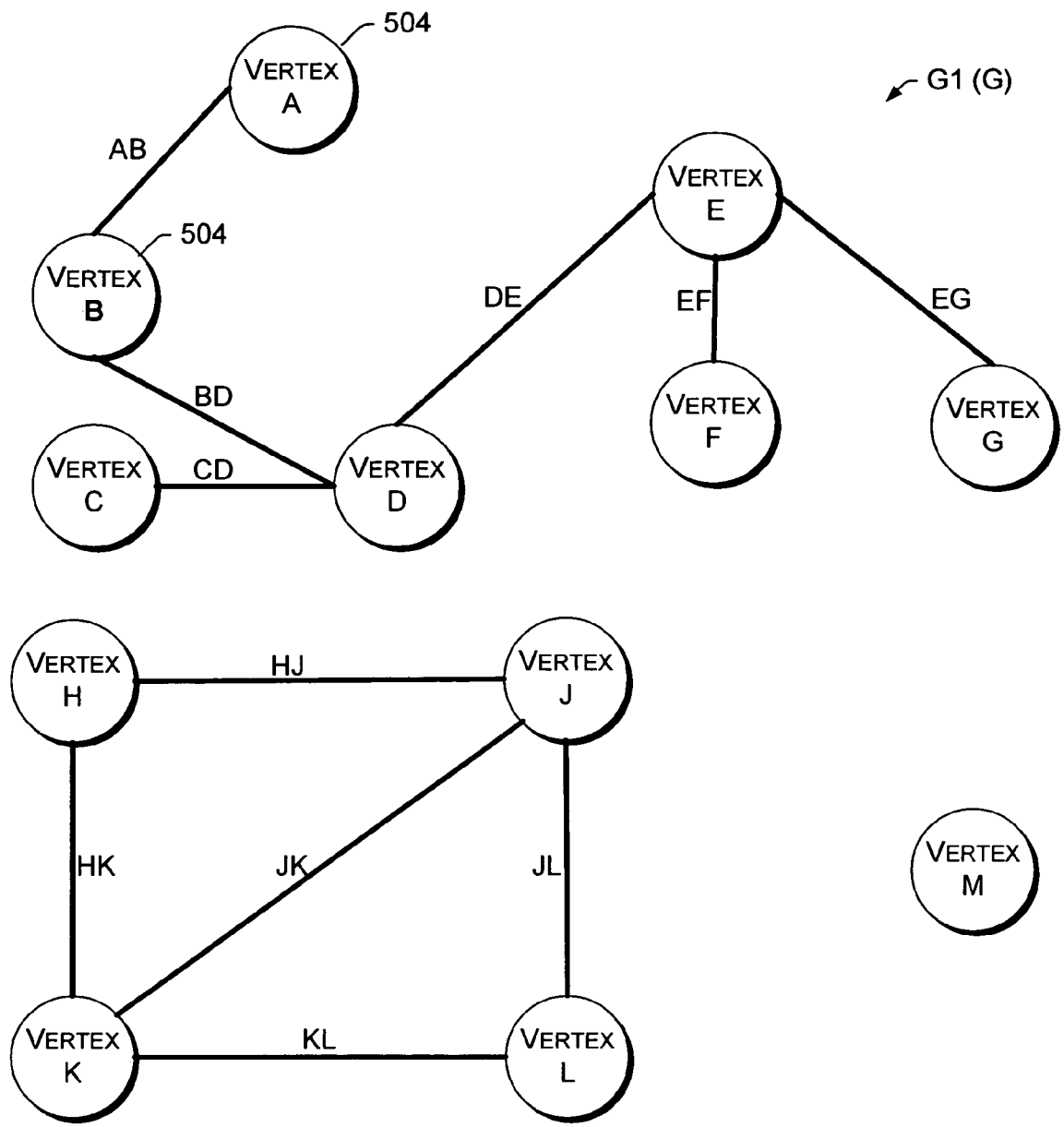
FIG. 8 is a diagram of one example of a graph to which the reduced degree searching mechanism of FIG. 7 can be applied.
Figure 9:
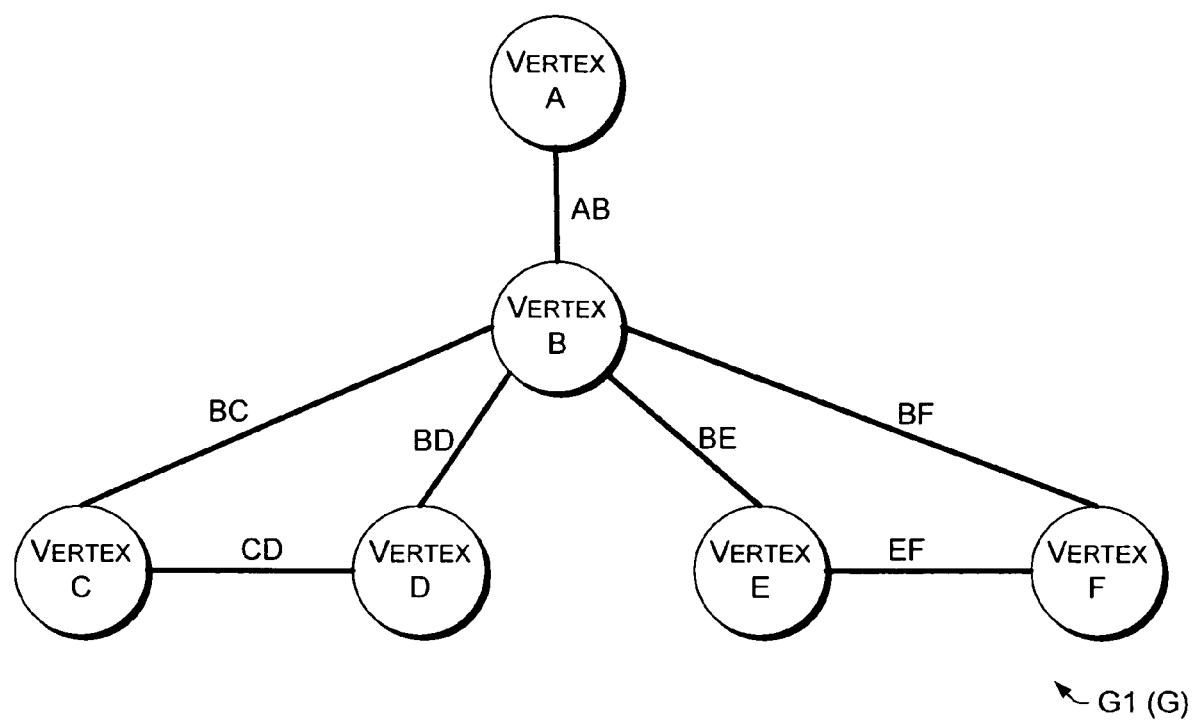
FIG. 9 is a diagram of one example of a graph to which the reduced degree searching mechanism of FIG. 7 can be applied.
Figure 10:
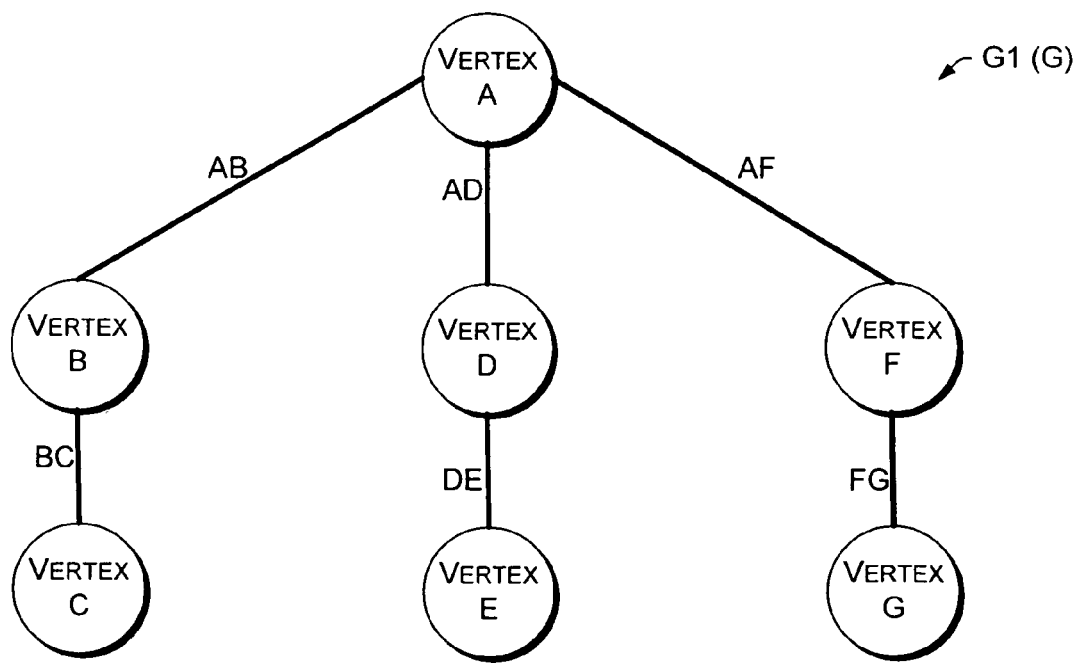
FIG. 10 is a diagram of one example of a graph to which the reduced degree searching mechanism of FIG. 7 can be applied.

To further describe the reduced degree searching technique which has been described relative to the vertex/edge graphs G1 of FIGS. 5 and 6, three further examples of vertex/edge graphs are provided with reference to FIGS. 8, 9, and 10 in which the reduced degree searching mechanism of FIG. 7 can be applied. Within FIGS. 8, 9, and 10 in this disclosure, each edge is defined by the reference character of the associated vertices. For example, the edge running between vertex A and vertex B is described as edge AB. Another nomenclature for edges such as shown in FIGS. 5 and 6 indicates the numeric set of edges in a sequence (e.g., $e_1, e_2, \ldots, e_j$). Each step (1 to 5) as shown in Table 1 is now described within the respective FIGS. 8, 9, and 10 vertex/edge graph.

The first example pertains to the vertex/edge graph G1 as shown in FIG. 8. For step 1 in Table 1, let the vertex/edge graph G1 of FIG. 8 be assigned as the modified vertex/edge graph G, and assign the edge number variable j to 0.

For the second step in Table 1, select an edge as edge $e_0$ in the modified vertex/edge graph G so that both two associated vertices have the minimum degree of any edge. To ensure that both of the associated vertices are with the minimum degree, first find the selected vertices that have a minimum degree in which the degree is greater than 0 among all the vertices in the modified vertex/edge graph G (from vertices A to L). Then, for all of the neighboring vertices for each selected vertex, find the neighboring vertex with the minimum degree. Finally, choose the pair including one selected vertex and one neighbor vertex that combines to produce the minimum total degree. Considering that in the modified vertex/edge graph G, vertex A, vertex C, vertex F, and vertex G all have the degree of 1 (which is the minimum potential degree that is still greater than 0). While vertex M has a degree of 0, this vertex is not considered.

Following step 2 of Table 1, the neighboring vertices of each one of vertex A, vertex C, vertex F, and vertex G are considered. Vertex A has only one neighbor vertex B with a degree of 2. Vertex C's only neighbor is vertex D with a degree of 3. Vertex F's only neighbor is vertex E with a degree of 3. Vertex G's only neighbor is vertex E with a degree of 3. Therefore, although vertex A, vertex C, vertex F, and vertex G each have the degree of 1, vertex A has a neighbor vertex B with the smallest degree of 2. The edge $e_0$ is therefore assigned as AB.

In step 3 of Table 1, for a current set of edges $e_0$, $e_1$, ..., $e_j$ within the modified vertex/edge graph G=G1-$\{e_0, e_1, \ldots, e_j\}$, if there are no neighboring edges of edge $e_j$($e_j$=Ø), the edge number variable is incremented (increment j) to proceed to the next edge, and the reduced degree searching technique continues to step 5 of Table 1. Otherwise, among the neighboring edges of edge $e_j$, an edge is selected as $e_{j+1}$ so that both two associated vertices are with the minimum degree; and the edge number variable is incremented (increment j) to proceed to the next edge. As such, in the modified vertex/edge graph G=G1-$e_0$, the edge $e_0$=AB only has one neighboring edge BD, so edge $e_1$ is chosen as edge BD. The edge number variable is then set to 1 (j=1).

In the remaining modified vertex/edge graph G=G1-{AB, BD}, the neighbor edges of the edge $e_1$=BD are edge CD and edge DE. One of these two edges is selected as $e_2$ so that the associated two vertices of the selected one have the smallest degree. Edges CD and DE share the common vertex D, so the degrees of vertex C and vertex E are compared. The degree of the vertex C is 1 while the degree of the vertex E is 3. The edge $e_2$=CD is therefore selected. The edge number variable is then incremented to 2 (j=2).

In the remaining vertex/edge graph G=G1-{AB, BD, CD}, the only neighbor edge of the edge $e_2$=CD is edge DE. Edge DE is chosen as the edge $e_3$. The edge number variable is incremented to 3 (j=3). Considering the remaining modified vertex/edge graph G=G1-{AB, BD, CD, DE}, the neighbor edges of the edge $e_3$=DE are edge EF and edge EG. One of them is selected as edge $e_4$ so that the associated two vertices of the selected one have the smallest degree between these two edges. Note that edge EF and edge EG share a common vertex E, so the degree of vertex F is compared to vertex G. Since both vertex F and vertex G have the same degree of 1, edge EF is arbitrarily selected as edge $e_4$. The edge number variable is incremented to 4 (j=4).

In the modified vertex/edge graph G=G1-{AB, BD, CD, DE, EF}, the only neighbor edge of edge $e_4$=EF is edge EG. So, edge EG is selected as edge $e_5$, which represents the last edge in the upper patch as shown in FIG. 8. The edge number variable is incremented to 5 (j=5). Now, in the modified vertex/edge graph G=G1-{AB, BD, CD, DE, EF, EG}, there is no neighbor edge of edge EG. The edge number variable is further incremented to 6 (=6), and step 3 of Table 1 continues to step 4 of Table 1. There are no further edges, as such the reduced degree searching algorithm cannot proceed as per step 4 of Table 1.

In step 5 of Table 1, if E-$\{e_0, e_1, \ldots, e_j\}$≠Ø, let the modified vertex/edge graph G=G1-$\{e_0, e_1, \ldots, e_j\}$ and return to step 2 of Table 1, otherwise stop. Where E denotes the set of all the edges, E-{AB, BD, CD, DE, EF, EG}={HJ, HK, KJ, KL, JL}≠Ø. As such, the reduced degree searching technique continues back to step 2 of Table 1 again to consider the edges in the path to the lower left in FIG. 8.

In step 2 of Table 1 using the reduced degree searching technique as applied to FIG. 8, the modified vertex/edge graph G=G1-{AB, BD, CD, DE, EF, EG}={HJ, HK, KJ, KL, JL}. The edge $e_6$ is selected so that the two associated vertices of the selected edge have the smallest degree. According to the interpretation of "two associated vertex of the selected edge have the smallest degree", first find the vertices among all candidate vertices {H, J, K, L) with the smallest degree and then for each of these selected vertices, the neighbor vertex with the smallest degree is found. Vertices H and L each have a degree of 2 while vertices J and K each have a degree of 3. Thus the candidate vertices are {H, L}. For vertex H, its neighbors are vertex K (degree=3) and vertex J (degree=3). The neighbor with the smallest degree is arbitrarily selected as vertex K. Vertex L has neighbors vertex K (with a degree=3) and vertex J (degree=3). So, vertex K is arbitrarily chosen as its neighbor with the smallest degree. Since vertex H and vertex L have same degree, and furthermore, the smallest degrees of their neighbors are also the same, the edge HK is arbitrarily chosen as the edge $e_6$ in the modified vertex/edge graph.

Continuing to step of Table 1, the neighbor edges of the edge $e_6$ are {HJ, KJ, KL}≠Ø, so one edge is selected as edge $e_7$ among the edge set {HJ, KJ, KL}. According to the criteria that the two associated vertex of the selected edge should have the smallest degree, such as is satisfied by the edge HJ (the degree of vertex H=1, and the degree of vertex J=3). So, the edge HJ is selected as the edge $e_7$, and the edge number variable is set to 7 (j=7). In the modified vertex/edge graph G=G1-{AB, BD, CD, DE, EF, EG, HK, HJ}, the neighbor edges of edge HJ are edge JK and edge JL. By following the similar procedure, the next edge $e_8$ can be selected as either edge JK or edge JL. Edge $e_8$ is arbitrarily selected as edge JK, and the edge number variable is set to 8 (j=8). In the modified vertex/edge graph G=G1-{AB, BD, CD, DE, EF, EG, HK, HJ, JK}, the neighbor edges of edge JK are edge KL and edge JL.

By following the similar procedure, the next edge $e_9$ is chosen as edge JL or edge KL. Edge $e_9$ is arbitrarily selected as edge KL, and the edge number variable is incremented to 9 (j=9). Now, in the modified vertex/edge graph G=G1-{AB, BD, CD, DE, EF, EG, HK, HJ, JK, KL}, the neighbor edges of edge KL is edge JL. By following the similar procedure, the next edge $e_{10}$ is chosen to be edge JL, and the edge number variable is set to 10 (j=10). Now, in the modified vertex/edge graph G=G1-{AB, BD, CD, DE, EF, EG, HK, HJ, JK, KL, JL}, and, we set the edge number variable to 11 (j=11). The neighbor edge of the edge JL is Ø and according to step 4 of Table 1, we cannot proceed and continue to Step 5.

In Step 5 of Table 1, if E-$\{e_0, e_1, \ldots, e_j\}$≠Ø, let the modified vertex/edge graph G=G1-$\{e_0, e_1, \ldots, e_j\}$ and return to Step 2; otherwise, stop. Since E-{AB, BD, CD, DE, EF, EG, HK, HJ, JK, KL, JL}=Ø, the reduced degree searching technique stops.

The order of the flow corresponds in the modified vertex/edge graph in FIG. 8 to edge AB, edge BD, edge CD, edge DE, edge EF, edge EG, edge HK, edge HJ, edge JK, edge KL, and edge JL. The reduced degree searching technique provides a reduced processing solution which achieves the lower bound since every two contiguous edges share a common vertex except where necessary to transition between adjacent patches.

The second example of the reduced degree searching technique is described with respect to FIG. 9. The reduced degree searching technique is described step by step for this vertex/edge graph G1. In step 1 of Table 1, let the modified vertex/edge graph G equal the value of the vertex edge graph G1, and the edge number variable is set to 0 (j=0);

In step 2 of Table 1, an edge is selected as edge $e_0$ in the modified vertex/edge graph G so that both two associated vertices are with the minimum degree. In the modified vertex/edge graph G, vertex A has a degree of 1. In addition, it only has one neighbor vertex B. So, we choose edge $e_0$=AB. In the vertex/edge graph G1, although the degree of vertex C is 2 and degree of vertex D is 2 (so the total degree for the two vertices of edge CD is 4 which is smaller than that of edge AB which is 1+4=5), however, according to the criteria, choose the edge AB instead of the edge CD as edge $e_0$ since vertex A has the smallest degree (1) of any vertex.

Step 3 of Table 1 is applied as follows. In the modified vertex/edge graph G=G1-$e_0$, the edge $e_0$=AB has four neighbor edges {BC, BD, BE, BF}. One of these neighbor edges is selected as edge e1 so that the degree of the two associated vertices of the selected one is smallest. All four edges share a common vertex B, so, we only need to compare the degree of the vertex C, vertex D, vertex E, and vertex F. Since their degree are all equal to 2, so we arbitrarily choose edge $e_1$=BD. The edge number variable is set to 1 (j=1). In the modified vertex/edge graph G=G1-{AB, BD}, the neighbor edges of edge $e_1$=BD are {BC, BE, BF, DC}, one of which is selected as edge $e_2$ so that the totaled vertices combine to the smallest degree. In the modified vertex/edge graph G=G1-{AB, BD}, edge $e_2$ is selected as DC since vertex D has the smallest degree (1). The edge number variable is set to 2 (j=2).

In the modified vertex/edge graph G=G1-{AB, BD, DC}, the only neighbor edge of edge $e_2$=DC is edge BC. So, we choose edge $e_3$=BC. The edge number variable to 3 (j=3). Now, in the modified vertex/edge graph G=G1-{AB, BD, DC, BC}, the neighbor edges of edge $e_3$=BC are {BE, BF}, so one of these edges are selected as edge $e_4$. Since vertex E has the same degree as vertex F, edge $e_4$ is arbitrarily selected as edge BE. The edge number variable to 4 (j=4). Now, in the modified vertex/edge graph G=G1-{AB, BD, DC, BC, BE}, the neighbor edges of edge $e_4$=BE is {BF, EF}. Since edge BF shares common vertex F with edge EF, compare the degrees of vertex B and vertex E. These two vertices have the same degree. So, we arbitrarily choose edge $e_5$=BF. And set the edge number variable to 5 (j=5).

Now, in the modified vertex/edge graph G=G1-{AB, BD, DC, BC, BE, BF}, the only neighbor edge of edge $e_5$=BF is edge EF that is chosen as edge $e_6$. The edge number variable is set to 6 (j=6). Now, in the modified vertex/edge graph G=G1-{AB, BD, DC, BC, BE, BF, EF}, the neighbor edge of edge $e_6$ is Ø. As per step 4 of Table 1, we cannot proceed further, so, we set the edge number variable to 7 (j=7) and continue to step 5. If E-{$e_0,e_1,\ldots,e_j$}≠Ø, let the modified vertex/edge graph=G1-{$e_0,e_1,\ldots,e_j$} and go back to Step 2 of Table 1; otherwise, stop the reduced degree searching technique. Since E-{AB, BD, DC, BC, BE, BF, EF}=Ø, the reduced degree searching technique is complete.

The sequence of the flows that are obtained from the second reduced degree searching example corresponds to edge AB, edge BD, edge DC, edge BC, edge BE, edge BF, and edge EF within the modified vector/edge graph G. For this configuration of vertices and edges, the solution found is optimal which achieves the lower bound since every two contiguous edges share a common vertex (and the corresponding flows share a common computing device).

For the third example, the reduced degree searching technique is described step by step for the vertex/edge graph G1 shown in FIG. 10. As per step 1 of Table 1, let the modified vertex/edge graph G=G1, and set the edge number variable to 0 (j=0).

In step 2 of Table 1, in the modified vertex/edge graph G, an edge is selected as edge $e_0$ in the modified vertex/edge graph G so that both of the edge's associated vertices have the minimum degree. Specifically, in the modified vertex/edge graph G: vertex C, vertex E, and vertex G each have the degree of 1. In addition, the only neighbor vertex of vertex C is vertex B with a degree of 2. The only neighbor vertex of vertex E is vertex D with a degree of 2. The only neighbor vertex of vertex G is vertex F with a degree of 2. So, we arbitrarily choose edge $e_0$=BC.

For the current set of edges $e_0,e_1,\ldots,e_j$, in the modified vertex/edge graph G=G1-{$e_0, e_1, \ldots, e_j$}, if the neighboring edges of edge $e_j$=Ø, and increment the edge number variable (increment j) to proceed to the next edge and go to step 5 of Table 1; otherwise, among the neighboring edges of edge $e_j$, select an edge as edge $e_j$+1 so that both two associated vertices are with the minimum degree, and increment the edge number variable (increment j) to continue to the next edge. In the modified vertex/edge graph G=G1-{BC}, since the only neighbor of edge $e_0$=BC is edge AB, so we choose edge $e_1$=AB and set the edge number variable to 1 (j=1).

Continuing to step of Table 1. Now, in the modified vertex/edge graph G=G1-{BC, AB}, the neighbor edges of edge $e_1$=AB are {AD, AF}. So, the task is to choose one of them as edge $e_2$ so that the associated two vertices of the selected one have the smallest degree. Since these two share a common vertex A, we only need to compare the degree of vertex D and vertex F. Since vertex D and vertex F have the same degree (=2), we arbitrarily choose edge $e_2$=AD and set the edge number variable to 2 (j=2). Now, in the modified vertex/edge graph G=G1-{BC, AB, AD}, the neighbor edges of edge $e_2$=AD are {DE, AF}. One of these edges are chosen as edge $e_2$ so that the associated two vertices of the selected one have the smallest degree. First, in the modified vertex/edge graph G=G1-{BC, AB, AD}, vertex D, vertex E, and vertex A all have degree of 1. Next, the neighbor of vertex D is vertex E which has a degree of 1; the neighbor of vertex E is vertex D which has a degree of 1; the neighbor of vertex A is vertex F which has a degree of 2. So, finally, vertex D and vertex E are selected (i.e., edge $e_3$=DE) and set the edge number variable to 3 (j=3). Now, in the modified vertex/edge graph G=G1-{BC, AB, AD, DE}, the neighbor edges of edge $e_3$=DE is empty. So, we set the edge number variable to 4 (j=4) and go to step 5 of Table 1.

If E-{$e_0, e_1, \ldots, e_j$}≠Ø, let the modified vertex/edge graph=G1-{$e_0, e_1, \ldots, e_j$} and go back to Step 2 of Table 1; otherwise, stop. Now, since E-{BC, AB, AD, DE}={AF, FG}≠Ø, so let the modified vertex/edge graph=G1-{BC, AB, AD, DE} and go back to step 2 of Table 1. In the modified vertex/edge graph G, we select an edge as edge $e_0$ in the modified vertex/edge graph G so that both two associated vertices are with the minimum degree. Now, in the modified vertex/edge graph G, we only have two edges {AF, FG}. First, the vertex with the smallest degree is A and G which both have a degree of 1. On the other hand, their only neighbor is vertex F. So, we arbitrarily choose edge $e_4$=AF. For current set $e_0,e_1,\ldots,e_j$, in the modified vertex/edge graph G=G1-{$e_0, e_1, \ldots, e_j$}, if the neighboring edges of edge $e_j$=Ø, and increment the edge number variable (increment j), proceed to the next edge, and continue to step 5 of Table 1; otherwise, among the neighboring edges of edge $e_j$, select an edge as edge $e_j+1$ so that both two associated vertices are with the minimum degree; and increment the edge number variable (increment j) to continue to the next edge. Since current edge $e_4$=AF, the only neighbor is edge FG, so we choose edge $e_5$=FG and set the edge number variable to 5 (j=5). Now, in the modified vertex/edge graph G=G1−{BC, AB, AD, DE, AF, FG}, the neighbor edges of edge $e_5$=FG is empty. So, we set the edge number variable to 6 (j=6) and go to step 5 of Table 1.

If E−{$e_0,e_1, \ldots, e_j$}≠∅, let the modified vertex/edge graph G=G1−{$e_0,e_1, \ldots, e_j$} and go back to step 2 of Table 1; otherwise, stop. Now, E−{$e_0,e_1, \ldots, e_j$}=∅, so we stop. The sequence of the flows that are obtained from the second reduced degree searching example corresponds to edge BC, edge AB, edge AD, edge DE, edge AF, and edge FG in the vertex/edge diagram G1. Although the vertex/edge graph G1 is a connected graph, there is no way to achieve the lower bound. There is no common vertex from edge DE to edge AF, and following the reduced degree searching technique actually progresses through step 5 of Table 1 three times. As such, even in vertex/edge graph instances where there is only one patch (e.g., for a connected graph), we may need to loop through to step 5 of Table 1 multiple times.

Computing Devices

One embodiment of a computer environment 1100 that can support the network 101 and the computing devices 106 as shown in FIG. 1 to run the reduced degree searching technique 700 of FIG. 7 is described within this disclosure is described with respect to FIG. 11. The network 101 as described relative to FIG. 1 represents one embodiment of the computer environment 1100 described relative to FIG. 11. The computer environment 1100 illustrated in FIG. 11 is a general computer environment, which includes at least one general-purpose computing device 1102. The computing device 1102 can include, for example, one or more stand alone computers, networked computers, mainframe computers, PDAs, cellular telephones, portable handheld telephones, wireless devices, electronic devices, microcomputers or microprocessors, or any other computer devices that use a processor in combination with a memory.

The components of the computing device 1102 can include, but are not limited to, one or more processors or processing clients 1104 (optionally including a cryptographic processor and/or co-processor), a system memory 1106, and a system bus 1108 that couples the various system components. The computer environment 1100 can include wired portions and/or wireless portions as is generally known with networked-devices.

The computer 1102 may also include other removable/non-removable, volatile/non-volatile computer storage media. By way of example, FIG. 11 illustrates a hard disk drive 1115 for reading from and writing to a non-removable, non-volatile magnetic media (not shown), a magnetic disk drive 1118 for reading from and writing to a removable, non-volatile magnetic disk 1120 (e.g., a "floppy disk"), and an optical disk drive 1122 for reading from and/or writing to a removable, non-volatile optical disk 1124 such as a CD-ROM, DVD-ROM, or other optical media. The hard disk drive 1115, the magnetic disk drive 1118, and the optical disk drive 1122 are each connected to the system bus 1108 by one or more data media interfaces 1127. Alternatively, the hard disk drive 1115, magnetic disk drive 1118, and optical disk drive 1122 can be connected to the system bus 1108 by one or more interfaces (not shown).

The disk drives and their associated computer-readable media provide non-volatile storage of computer readable instructions, control node data structures, program modules, and other data for the computer 1102. Although the example illustrates a hard disk within the hard disk drive 1115, a removable magnetic disk 1120, and a non-volatile optical disk 1124, it is to be appreciated that other types of the computer readable media which can store data that is accessible by a computer, such as magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like, can also be utilized to implement the exemplary computer environment 1100.

Any number of program modules can be stored on the hard disk contained in the hard disk drive 1115, magnetic disk 1120, non-volatile optical disk 1124, ROM 1112, and/or RAM 1110, including by way of example, the OS 1126, one or more application programs 1128, other program modules 1130, and program data 1132. Each OS 1126, one or more application programs 1128, other program modules 1130, and program data 1132 (or some combination thereof) may implement all or part of the application programs to be used over the network 101 as shown in FIG. 1.

The computer 1102 can operate in a networked environment using logical data signal connections to one or more remote computers, such as a remote computer device 1148. By way of example, the remote computer device 1148 can be a personal computer, portable computer, a server, a router, a network computer, a peer device or other common network node, game console, and the like. The remote computer device 1148 is illustrated as a portable computer that can include many or all of the elements and features described herein relative to the computer 1102.

Logical data signals between the computer 1102 and the remote computer device 1148 are depicted as a local area network (LAN) 1150 and a general wide area network (WAN) 1152. Such networking environments are commonplace in offices, enterprise-wide computer networks, intranets, and the Internet.

In a networked environment, such as that illustrated with the computer environment 1100, program modules depicted relative to the computer 1102, or portions thereof, may be stored in a remote memory storage device. By way of example, remote application programs 1158 reside on a memory device of the remote computer 1148.

Various modules and techniques described herein may relate to the general context of the computer-executable instructions, such as program modules, executed by one or more computers or other devices. Generally, program modules include routines, programs, control objects 1150, components, control node data structures 1154, etc. that perform particular tasks or implement particular abstract data types. Often, the functionality of the program modules may be combined or distributed as desired in various embodiments.

An implementation of these modules and techniques may be stored on or transmitted across some form of the computer readable media. Computer readable media can be any available media that can be accessed by a computer. By way of example, and not limitation, computer readable media may comprise "computer storage media" and "communications media."

"Computer storage media" includes volatile and non-volatile, removable and non-removable media implemented in any process or technology for storage of information such as computer readable instructions, control node data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

The term "communication media" includes, but is not limited to, computer readable instructions, opcodes, control node data structures, program modules, or other data in a modulated data signal, such as carrier wave or other transport mechanism. Communication media also includes any information delivery media. The term "modulated data signal" means a signal that has one or more of its characteristics set or changed in such a manner as to encode information in the signal including but not limited to a TDMA technique. By way of example, and not limitation, communication media includes wired media such as a wired network or direct-wired data signals, and wireless media such as acoustic, RF, infrared, and other wireless media. Combinations of any of the above are also included within the scope of computer readable media.

Although the description above uses language that is specific to structural features and/or methodological acts, it is to be understood that the invention defined in the appended claims is not limited to the specific features or acts described. Rather, the specific features and acts are disclosed as exemplary forms of implementing the invention.

The invention claimed is:

1. A method for power management of a network including a plurality of computing devices, the method comprising:
    identifying an order of flows between one or more computing devices within a prescribed time period; and
    reducing a number of wakeups for at least one computing device by increasing a number of adjacent flows that share a computing device, the reducing comprising:
    deriving a vertex/edge graph in which a vertex of the vertex/edge graph represents a computing device and an edge of the vertex/edge graph represents data communications between a pair of computing devices;
    selecting a first edge that extends between two associated vertices, the two associated vertices have a reduced degree compared to any other pair of associated vertices;
    removing the first edge;
    selecting a subsequent neighbor edge to the first edge, and removing the subsequent edge; and
    removing the subsequent edge, wherein the order that the first edge and any subsequent edge are removed corresponds to the order of the flows within the network.

2. The method of claim 1, wherein the reduced degree of the edge indicates that one of the associated vertices has the same or lower degree of any vertex in the graph, and the other associated vertex of the edge has a lower degree than any other vertex that is a neighbor of one vertex that has the same or lower degree of any vertex in the graph.

3. A method for power management of a network including a plurality of computing devices, comprising:
    identifying an order of flows between one or more computing devices within a rescribed time period;
    reducing a number of wakeups for at least one computing device by increasing a number of adjacent flows that share a computing device; and
    wherein data communications between multiple computing devices within the network can be represented graphically as including a number of vertices and a number of edges.

4. The method of claim 3, wherein the reducing a number of wakeups for the one or more devices is performed by scheduling the order of computing devices within each time frame based on a reduced degree searching computation.

5. The method of claim 3, wherein the network includes a local area network (LAN).

6. The method of claim 3, wherein the network includes a wireless personal area network (WPAN).

7. The method of claim 3, wherein the network complies with the IEEE 802.15.3 standard.

8. The method of claim 3, wherein the network includes a wireless network.

9. A method for power management of a network including a plurality of computing devices, the method comprising:
    identifying an order of flows between one or more computing devices within a prescribed time period;
    reducing a number of wakeups for at least one computing device by increasing a number of adjacent flows that share a computing device; and
    generating a vertex/edge graph, wherein the network includes a number of edges that extend between different vertices within the vertex/edge graph, and further comprising associating the edges to the flows.

10. A method of power management for a time division multiple access (TDMA) network, comprising:
    deriving a vertex/edge graph representing the TDMA network in which a vertex of the vertex/edge graph represents a computing device and an edge of the vertex/edge graph represents a request for data communications between a pair of computing devices;
    selecting a first edge has a pair of associated first vertices, the pair of associated first vertices have the same or lower order of any pair of associated vertices of any edge within the vertex/edge graph;
    removing the selected first edge from the vertex/edge graph;
    selecting a second edge that is a neighbor to the first edge which has two associated second vertices, the associated second vertices have the same or lower degree of any pair of associated vertices of any neighbor edge to the first edge within the vertex/edge graph; and
    removing the selected second edge from the vertex edge graph, wherein the sequence that the first edge and any subsequent edge are removed correlates to the order that corresponding computing devices will transmit corresponding data signals over the TDMA network.

11. The method of power management of claim 10, further comprising selecting a third edge that is a neighbor to the second edge which has two associated third vertices, the associated third vertices have the same or lower degree of any pair of associated vertices of any neighbor edge to the second edge within the vertex/edge graph, and wherein the order that each edge is removed correlates to the order that corresponding computing devices will transmit corresponding data signals over the TDMA network.

12. The method of claim 10, wherein the reduced degree of the first edge indicates that one of the associated vertices of the first edge has the same or lower degree of any vertex in the graph, and the other associated vertex of the first edge has a lower degree than any other vertex that is a neighbor of one vertex that has the same or lower degree of any vertex in the graph.

13. The method of power management of claim 10, wherein reducing the degree of both the first candidate vertex and the first neighbor vertex allows choosing the pair of vertices with the reduced combined degree.

14. The method of power management of claim 10, wherein reducing the degree of both the first candidate vertex and the first neighbor vertex allows choosing the pair of vertices with the reduced combined degree.

15. A tangible computer readable storage medium having computer readable instructions that when executed by a processor causes the processor to provide power management to a plurality of computing devices, by:
obtaining a sequence of one or more computing devices that can transmit data within the rescribed time period:
wherein the power management is provided by reducing a number of wakeups for the computing devices within the network which is performed by increasing a number of associated channel time allocation periods within a prescribed time period that share a common computing device; and
wherein the reducing the number of wakeups is performed by:
deriving a vertex/edge graph representing the network in which a vertex represents a computing device and an edge represents a request for data communications between a pair of computing devices;
selecting a first edge having a pair of associated first vertices, the pair of associated first vertices have or share the lowest degree of any pair of associated vertices in the vertex/edge graph;
removing the selected first edge;
selecting a second edge that was a neighbor to the removed first edge, the second edge having a pair of associated second vertices, the pair of associated second vertices is less than or equal to the degree of any associated pair of vertices of any neighbor to the removed first edge;
removing the selected second edge; and
wherein a sequence that the first edge, the second edge, and any subsequent selected edge is removed corresponds to the order that corresponding computing devices will transmit corresponding data signals over the network.

16. An apparatus, comprising:
a power management portion for a time division multiple access (TDMA) network, the TDMA network including a plurality of computing devices, wherein the power management portion reduces a number of wakeups for computing devices within the TDMA network by using:
means for deriving a vertex/edge graph representing the TDMA network in which a vertex represents a computing device and one edge that represents each request for data communications between a pair of computing devices;
means for selecting a first edge that at least shares the lowest degree of any edge in the vertex/edge graph;
means for removing the selected first edge;
means for selecting a neighbor edge that is a neighbor to the first edge, wherein they neighbor edge has or shares the lowest degree of any edge that is a neighbor to the first edge;
removing the neighbor edge; and
wherein the order that the first edge and the neighbor edge are removed corresponds to the order that corresponding computing devices will be permitted to use the TDMA network.

17. The apparatus of claim 16, wherein the means for selecting the lowest degree of the first edge indicates that one of the associated vertices of the first edge has the same or tower degree of any vertex in the graph, and the other associated vertex of the first edge has a lower degree than any other vertex that is a neighbor of one vertex that has the same or lower degree of any vertex in the graph.

18. The apparatus of claim 16, further comprising:
means for repeating the selecting the neighbor edge, and removing the neighbor edge.

19. The apparatus of claim 16, wherein the means for reducing the degree of the first edge allows choosing of associated vertices to the first edge that have a reduced combined degree.

20. The apparatus of claim 16, wherein the means for reducing the degree of the neighbor edge allows choosing of associated vertices to the neighbor edge that have a reduced combined degree.

21. An apparatus, comprising:
a power management portion for a time division multiple access network having a plurality of computing devices, wherein the power management portion reduces a number of wakeups for computing devices within the network by using:
a vertex/edge graph in which a vertex of the vertex/edge graph represents a computing device and an edge of the vertex/edge graph represents a request for data communications between a pair of computing devices;
a first edge having two associated first vertices, the two associated first vertices having a total degree that is equal to or less than the sum of the degrees of the any associated pair of vertices within the vertex/edge graph; and
wherein the power management portion considers the order that the first edge and any subsequent edges are removed as being related to the order that corresponding computing devices are allowed to use the network.

* * * * *

UNITED STATES PATENT AND TRADEMARK OFFICE
CERTIFICATE OF CORRECTION

PATENT NO. : 7,203,850 B2
APPLICATION NO. : 10/760914
DATED : April 10, 2007
INVENTOR(S) : Zihua Guo et al.

It is certified that error appears in the above-identified patent and that said Letters Patent is hereby corrected as shown below:

On the face page, in field (56), under "Other Publications" in column 2, line 2, delete "newtworks";" and insert -- networks"; --, therefor.

In column 11, line 55, delete "$e_{j+1}$," and insert -- $e_{j+1}$ --, therefor.

In column 13, line 64, delete "6 (=6)," and insert -- 6 (j=6), --, therefor.

In column 14, line 15, delete "L)" and insert -- L} --, therefor.

In column 14, line 29, after "step" insert -- 3 --.

In column 15, line 9, delete "0 (j=0);" and insert -- 0 (j=0). --, therefor.

In column 15, line 24, delete "e1" and insert -- $e_1$ --, therefor.

In column 16, line 24, delete "$e_j+1$" and insert -- $e_{j+1}$ --, therefor.

In column 16, line 30, after "step" insert -- 3 --.

In column 17, line 3, delete "$e_j+1$" and insert -- $e_{j+1}$ --, therefor.

In column 19, line 35, in Claim 1, delete "identifing" and insert -- identifying --, therefor.

In column 19, line 64, in Claim 3, delete "rescribed" and insert -- prescribed --, therefor.

In column 21, lines 5-8, remove Claim 14 by deleting "14. The method of power management of claim 10, wherein reducing the degree of both the first candidate vertex and the first neighbor vertex allows choosing the pair of vertices with the reduced combined degree."

In column 21, line 14, in Claim 15, delete "rescribed time period:" and insert -- prescribed time period; --, therefor.

Signed and Sealed this

Twenty-seventh Day of July, 2010

David J. Kappos
*Director of the United States Patent and Trademark Office*

In column 22, line 6, in Claim 16, delete "they" and insert -- the --, therefor.

In column 22, line 18, in Claim 17, delete "tower" and insert -- lower --, therefor.